United States Patent Office 3,418,981
Patented Dec. 31, 1968

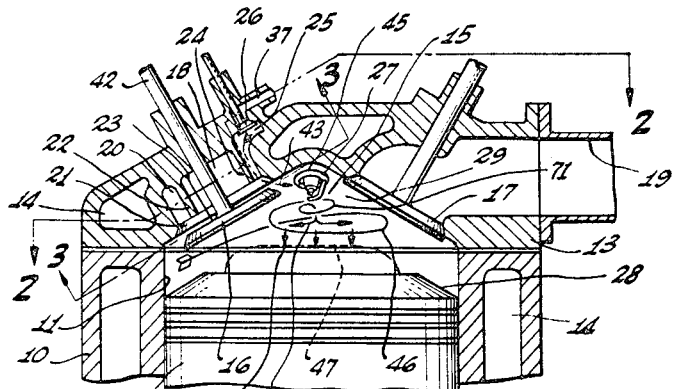

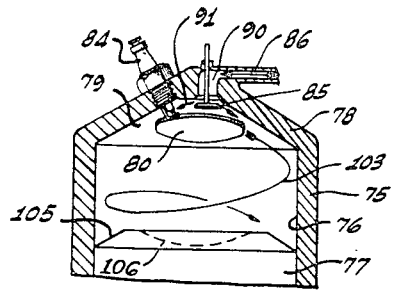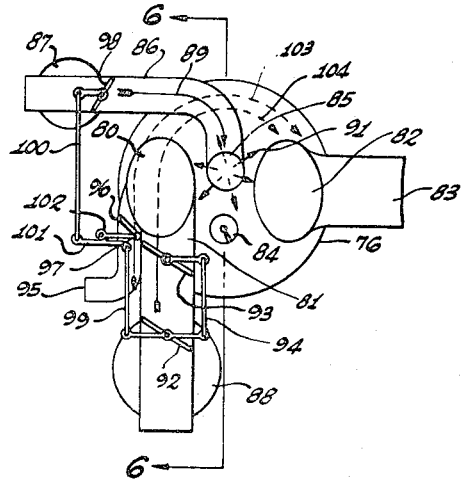

3,418,981
INTERNAL COMBUSTION CHAMBER AND PROCESS UTILIZING A DIFFUSED MIXTURE AND AUXILIARY AIR
Ernest A. von Seggern, 1051 E. Angeleno, Burbank, Calif. 91501, and Henry E. von Seggern, Rte. 2, Box 1910, Escondido, Calif. 92025
Continuation-in-part of application Ser. No. 601,480 Dec. 13, 1966. This application Nov. 14, 1967, Ser. No. 682,942
10 Claims. (Cl. 123—75)

ABSTRACT OF THE DISCLOSURE

An engine of the spark ignition type, with throttled and carbureted fuel supply, is provided in which heated auxiliary air is added to the combustion substantially during the time of maximum temperature and pressure in the engine cycle. The fuel-air mixture and the auxiliary air are held separately in the engine in stratified and adjoining relationship from the time of induction until ignition, and after ignition a substantial portion of the fuel-air mixture is burned before the air is mixed into the burning mixture. The fuel mixture is also stratified with respect to residual exhaust gases. Means for obtaining and maintaining stratification include: variable flow restricting and velocity increasing means in the induction system in close proximity to the intake valve; flow directing means to produce an organized circulation of fuel-air mixture about the length axis of the cylinder during the intake and compression cycles; means for independently introducing auxiliary air along the axis of circulation; means for concentrating the fuel mixture just prior to ignition; means for holding said fuel-air mixture and said auxiliary air separate for a brief period after ignition; and means for mixing said auxiliary air with said ignited fuel-air mixture at about the time of maximum temperature and pressure in the combustion chamber.

*Cross-references to related applications*

This application is a continuation-in-part of our prior co-pending application, Ser. No. 601,480, filed Dec. 13, 1966, and entitled "Internal Combustion Engine and Process Utilizing Heated Auxiliary Air to Obtain Complete Combustion."

*Field of the invention*

This invention relates to an internal combustion engine and process of the class in which heated auxiliary air is added to the combustion during the time of substantially maximum temperature and pressure in the engine cycle in order to obtain a complete and clean combustion. More specifically, it relates to a spark ignition engine of the class which operates with working fluids consisting of premixed fuel-air mixtures and auxiliary air in stratified relationship in the combustion chamber, and controls power output by varying the density of the working fluid.

*Background of the invention*

Many attempts have been made to utilize additional or auxiliary air in combination with a fuel-air mixture in an engine in order to obtain a more complete combustion than is normally obtained from the combustion of a substantially stoichiometric fuel-air mixture. It has been proposed to stratify the fuel-air mixture and the auxiliary air in the engine, and many engines are described which initially introduce the fuel-air mixture and the auxiliary air separately into the engine, but in practice, it has been found that by the time combustion is to begin, the fuel-air mixture and the air has been hopelessly mixed together and only a lean, slow burning fuel mixture is the final result. Attempts to physically separate the fuel-air mixture and the auxiliary air by means of pockets and baffles in the combustion chamber have been to no avail because the mixing induced by the turbulence and changes in volume which take place in the engine cylinder during the intake and compression cycles mixes the separate charges together. This is especially true in throttle controlled engines in which there is both an initial expansion and then a recompression of the working fluid in the cylinder during the intake and compression cycles.

It is accordingly an object of the present invention to provide means whereby a fuel-air mixture and auxiliary air may be introduced into an engine and be kept truly separate up to and slightly after the time of ignition and to do so at all speeds and loads including light power output when operating with low density throttled fuel-air mixtures.

*Summary of the invention*

The desired results are obtained by means of six operations which, for the most part, include dynamic flow patterns and are substantially carried out in sequence, but overlap to some extent. The first operation is to minimize the contamination of the fuel-air mixture by residual exhaust gases while the mixture is still in the intake manifold. This is particularly important in multiple cylinder engines having several cylinders connected to a common manifold. A variable restriction which is placed in the intake manifold in close proximity to the intake valve acts to impede the entry of residual exhaust gases into the intake manifold when the intake valve first opens. This is most effective at part load when the throttle is partially closed and relatively high vacuum (low pressure) is maintained in the intake manifold. There is also the added benefit that pumping losses are reduced.

The second operation is to direct the fuel-air mixture from the manifold into the engine cylinder at a substantial velocity for all variations of throttle opening, but commensurate also with engine speed. This action is obtained by means of the variable restriction adjacent the intake valve as described in the first operation.

The third operation is to establish an axial circulation in the engine cylinder about the length axis of the cylinder, and adjacent the cylinder wall, with the uncontaminated fuel-air mixture provided by means of the first and second operations. The fuel-air mixture is directed tangentially at high velocity into the engine cylinder in a plane substantially normal to the axis of the cylinder, and said mixture circulates therein during all of the intake and compression cycles. The flow is not destroyed by the motion of the piston, or by variations in the density of the working fluid.

The fourth operation takes place concurrently with the third operation and consists in supplying auxiliary air to the cylinder in a diffused body along the central axis of the cylinder. This air is placed inside the circulating fuel-air mixture, and remains separated therefrom during the intake and compression cycles. The air is supplied in limited and controlled quantity to each cylinder and in an amount substantially proportional to the fuel-air mixture. At the same time, the residual exhaust gases are concentrated along the lower end of said central axis below the auxiliary air body.

The fifth operation takes place toward the end of the compression cycle just prior to ignition and consists initially in directing the peripherally circulating fuel-air mixture into the substantially conical combustion chamber in a spirally converging flow toward the apex of the cone and then directing the mixture downward along the axis of the cylinder and then radially outward in an expanding and diffused flow. This acts to concentrate the peripheral fuel-air body into a compact and diffused charge in the vicinity of extended spark plug electrodes and also displaces the air downward from the apex of said combustion chamber where it was introduced during said fourth operation. The air displacement by the converging and expanding fuel mixture, and the resulting concentration of the axially located air body directly below the fuel-air mixture prepares the engine for the next operation.

The sixth operation takes place immediately after ignition. The diffused, concentrated and virtually uncontaminated fuel-air mixture ignites readily and burns very quickly and "implodes" on the air body which is partially enclosed by the burning mixture. The air is initially highly heated by the action of both radiant energy and increased compression due to combustion, but, then, due to the disturbance and turbulence caused by the "implosion" quickly mixes with the burning gases. This, in effect, produces a two stage combustion process in which the initial reaction takes place in a substantially stoichiometric mixture, followed by a second reaction which includes heated auxiliary air. This method of combustion is important because in any confined combustion, the products of combustion from the initial reaction mix with the active agents in the mixture and contaminate it and make it difficult to carry the burning to completion unless there is an excess of oxygen present at the end of combustion. Since an excess of oxygen present at the beginning of combustion produces the usual slow burning lean mixture, the only manner in which both a fast burning and a clean and complete burning mixture can be obtained is by means of a two stage burning process as described.

It is accordingly an object of the invention to provide an engine in which a two stage, fast burning and clean burning combustion is obtained which is both more thermally efficient and more free of undesirable exhaust contaminants than is found in conventional gasoline engines. Additional objects include the provision of means for concentrating a fuel-air mixture in the presence of residual exhaust gases and auxiliary air into a compact and fast burning fuel charge, means for holding a fuel charge and auxiliary air separate in the engine cylinder during the intake and compression cycles, and during wide changes in charge density, and means to prevent contamination if the fuel-air mixture with residual exhaust gases prior to induction into the engine cylinder.

Additional objects and features of the broad invention as well as special objects and features will be described in the specification in conjunction with the description of the various specific illustrative embodiments of the broad invention.

In the accompanying drawings, showing somewhat diagrammatically typical embodiments of the broad invention:

FIG. 1 is a vertical cross-section of a preferred form of multiple cylinder engine having a hemispherical combustion chamber with inclined valves (dual intake manifold not shown), taken along the line 1—1 in FIG. 2;

FIG. 2 is a plan view of the engine shown in FIG. 1, showing the fuel supply, dual manifold, and air control system, taken along the line 2—2 of FIG. 1;

FIG. 3 is a view of the intake valve seat and triple manifolds shown with the intake valve removed and along the line 3—3 of FIG. 1;

FIG. 4 is a diagrammatic view of the cylinder and head showing flow of fuel mixtures and air into the cylinder;

FIG. 5 is a diagrammatic cross-section of the combustion chamber taken along the line 5—5 in FIG. 2, showing the relation of the spark plug to the circulation pattern in the combustion chamber;

FIG. 6 is a vertical cross-section of an alternate form of the invention shown as a single cylinder engine using three valves in the cylinder head and with the position of the fuel mixture and air interchanged, the view being a section taken along the line 6—6 of FIG. 7;

FIG. 7 is a diagrammatic plan view of the engine shown in FIG. 6;

FIG. 8 is a vertical cross-section of the engine shown in FIG. 6 with the piston near to the end of the compression stroke;

FIG. 8 is a vertical cross-section of a second alternate form of the invention shown as a single cylinder engine having two valves in the cylinder head and a coaxial, toroidal type igintion chamber with a third fuel admission valve therein, the view being a section taken along the line 9—9 of FIG. 10;

FIG. 10 is a diagrammatic plan view of the engine shown in FIG. 9; and

FIG. 11 is a diagrammatic vertical section of the engine shown in FIG. 9, showing the flow of working fluid into and out of the ignition chamber.

The engine shown in FIGS. 1, 2, 3, and 4 is a substantially conventional four-cycle gasoline engine having a hemispherical combustion chamber with inclined intake and exhaust valves. It is shown with two cylinders of a multiple cylinder engine and shows a branched intake manifold and fuel supply system.

A cylinder block 10, having a cylinder bore 11 with reciprocating piston 12 therein, has a cylinder head 13 fastened onto the upper end thereof. A water jacket 14 is shown, but any conventional air or liquid cooling means may be used. A combustion chamber 15 of substantially hemispherical design is formed in head 13, which also includes valve seats for a conventional intake valve 16 and exhaust valve 17. These valves are operated in the conventional manner by the usual means (not shown). A large intake manifold 18 leads to the seat controlled by valve 16 and exhaust manifold 19 leads from the seat controlled by valve 17. There is also a small intake manifold 20 which is shown parallel to manifold 18, and is separated therefrom except near the intake valve 16. The manner in which the two manifolds terminate at the valve seat 21 is shown in FIG. 3 which shows the seat with the intake valve removed.

The dividing wall 22 of the two manifolds lies across the circular opening of the valve seat 21 like a chord and terminates immediately above the back side 23 of the intake valve 16. Substantially opposite wall 22 is another and smaller dividing wall 24 which also extends across the circular opening and may also be like a chord, though shown curved to illustrate variations in design. This wall also terminates immediately above the back side 23 of valve 16 (when said valve is closed), and extends away from said valve to form a passage 25. Said passage leads to a third valve 26 which may conveniently be of the poppet type, similar to valve 16, but smaller, and positioned parallel and close thereto, in order that it may be opened and closed in synchronism with valve 16 and by the same actuating mechanism (not shown), A spark plug 27 extends into the combustion chamber 15 at a point slightly off the center line of the cylinder, to provide space for large intake and exhaust valves. The spark plug is a standard commercial extension type with the electrodes 67 extended into the combustion chamber 15 below the level of the chamber walls. The piston 12 is shown with a beveled head 28 which, in combination with the hemispherical cavity 29 in head 13, produces a peripheral squish zone in the combustion chamber 15. This is not close fitting, however, which would produce a quench zone, but is quite open. This engine, and others as shown in FIGS. 5 and 9, operate satisfactorily with just a conventional flat top piston.

The discharge ends of intake manifolds 18 and 20 are positioned tangentially with respect to the cylinder 11, as shown in FIG. 2, and the end of third passage 25 is positioned substantially adjacent the central axis of said cylinder. In a multiple cylinder engine, the individual passages 18 and 20 for each cylinder are joined into manifolds 30 and 31, respectively, in the conventional manner, with preferably not more than six cylinders joined to a single passage. The engine is shown with two cylinders of a four (or six) cylinder engine, and manifolds 30 and 31 are connected to a "two-barrel" carburetor 32 which has independent throttles 33 and 34. These throttles will be operated in a manner to be described, which is not conventional. In an eight cylinder engine, the carburetor would be made in the form of a "four-barrel" type with dual throttles for dual large and small intake manifolds.

Individual auxiliary throttles 35 are placed in each branch manifold passage 18 at a point in close proximity to the intake valves 16 and are all connected together by rods 36 and to the large throttle 33 by a rod 36a so that they all open and close together.

The individual air passages 25 are connected into a common manifold 37 beyond the valves 26 and are branched in a manner analogous to the manifolds 30 and 31. The air passages 25 may, however, have individual manifolds if desired, with separate air valve control. Air control valve 38 is placed at the inlet end of manifold 37 and is coordinated in its operation with throttles 33 and 34 in a manner to be described.

At full load, the engine operates substantially as a standard gasoline engine, except that some auxiliary air is also admitted to the cylinder. During the intake cycle throttles 33 and 34 are both fully open, together with auxiliary throttles 35 and air control valve 38. Carburetor 32 supplies a substantially stoichiometric fuel-air mixture to manifolds 30 and 31, and thence to branch manifolds 18 and 20, respectively, which direct the mixtures into the cylinder 11 through valve 16 in a dual spiral flow as indicated by arrows 39 and 40 in FIG. 4. Simultaneously, air from manifold 37 passes down passage 25 in a direction substantially parallel to the valve stem 42 and impinges on the back side 23 of valve 16, from where it flows for the most part radially out toward the central axis 41 of the cylinder 11 in a flow 43. The cross-section of passage 25 is made larger than that of manifold 37 to insure that the air is diffused therein after passing valve 26, and enters the combustion chamber 15 at low velocity. This causes the air to collect on the upper end of said axis in the vicinity of the combustion chamber 15 in a body whose extent is indicated generally by the dotted lines 44, while the residual exhaust gases is the cylinder are driven, by the combined action of the entering fuel mixture and the entering air, toward the lower end of said cylinder, and along said axis 41, forming a body whose extent is indicated generally by the dotted line 68 as shown in FIG. 4.

Although the volume of the gases in the cylinder change during the compression cycle, the relative position of the fuel mixture, the auxiliary air and the residual exhaust gases remain relatively unchanged. This is because the piston motion along the axis of the cylinder does not destroy the circulation which is in a plane normal to said axis. Toward the end of the compression stroke, but before ignition occurs, the circulation pattern is modified due to the close approach of the piston 12 to the hemispherical cavity 29. The approach of the periphery of the piston to the hemispherical wall of the combustion chamber is closer than that of the central region and this causes a squish action, which may be enhanced as much as desired, by beveling the outer portion 28 of the piston top as shown and fixing the clearance. The fuel mixture, which is circulating adjacent the cylinder wall 11 is displaced toward the upper central apex 45 of the combustion chamber in a converging spiral flow as indicated by arrow 46 and into the vicinity of the spark plug 27. The central air body 44, which was stored in the region of the apex 45 of the combustion chamber is displaced downwardly from its initial position by the advancing fuel mixture as indicated by arrows 69 and collects on the central area of the piston top in a body 47 below the fuel mixture, while the bulk of the peripheral fuel mixture is momentarily concentrated in and near the apex 45 at the time of ignition.

The converging spiral flow and the circulation produced by it is particularly effective in four ways. It produces a separation of the fuel mixture and the auxiliary air; it forms the peripherally circulating fuel mixture into a concentrated body; it diffuses the fuel mixture, to insure good ignition; and it provides a diffused buffer between the fuel mixture and auxiliary air to minimize intermixing thereof. Its effectiveness is due to a unique combination of forces. The circulating mixture in the cylinder tends initially, due to centrifugal forces, to stay adjacent the cylinder wall. This force is, however, overcome at the end of the compression cycle by the piston squish which directs the mixture to flow in a converging spiral 46 toward the apex 45 of the combustion chamber.

It will be recognized that the single arrow 46 in FIG. 1 is not a true representation of the actual flow pattern, which consists of a multiplicity of flows all simultaneously converging in from the periphery of the cylinder toward the center of the cylinder. In producing this spiral flow pattern, it is important to establish a proper balance between the initial circulating velocity established in the cylinder by flows 39 and 40, and the radial squish velocity produced by the piston 12 toward the end of the compression stroke. The combined action of these two velocities produces the spiral flow, and either one may be too large at the expense of the other. Just enough squish is provided to drive the circulating mixture to the center, plus a mild, axial down flow 70 (FIG. 5) along the cylinder axis 41, while the angular momentum of the mixture is largely preserved, producing a high angular velocity of the mixture at the center, generally indicated by the small radius curve 71 shown in FIG. 1. Not shown, because of the difficulty of pictorial representation, is the fact that the spin persists along the path 70 (FIG. 5). As soon, however, as the spinning mixture escapes below the converging mixture adjacent the conical combustion chamber walls, it is free to expand, and due to the centrifugal forces acting on the spinning mixture, flows radially outwardly as indicated by the several arrows 48. The upper arrow shows the initial expansion, and the lower arrow the subsequent expansion as more of the mixture collects inside the conical space beneath the upper converging mixture flow 46.

It will be evident that the radial expansion produces a diffusion and loss of angular momentum. The relatively high velocity mixture is largely transformed into a diffused and quiescent mixture located directly under and within the conical converging mixture 46. As the size of the diffused mixture body increases, it will act to displace the air from this space originally occupied by the auxiliary air introduced there during the intake cycle through valves 26 and 16. This displacement is indicated by arrows 69, and it is important to note that both bodies are relatively quiescent, permitting the displacement to occur without appreciable intermixing.

The usual peripheral squish induced flows in conventional combustion chambers are all designed to mix the contents of the combustion chamber. The flow described above is unique in that it is not a mixer, but a displacer, diffuser and concentrator. It forms a buffer between the high velocity converging mixture adjacent the substantially conical combustion chamber walls of the hemispherical combustion chamber 15 and the air body 47. The extension spark plug 27, as shown in FIG. 5, has its electrodes 67 extend into this diffused buffer zone, and combustion is initiated therein. Flow 46 is shown as a flat projection in FIG. 5 to illustrate how it flows between the electrodes 67 and the combustion chamber wall.

The fuel mixture, throughout the entire intake and compression cycle, is held together by a fast moving, dynamically stable system, which changes its shape during the engine cycle but maintains a stable interface between itself and the central air and residual exhaust gas. Interface mixing, associated with extremes of velocities, is greatly reduced by the diffused horizontal radial flow 48, which flows between the high velocity, converging fuel-air mixture and the more quiescent auxiliary air, and effectively separates the two bodies. The circulation of the fuel mixture acts to supply the spark plug with a diffused and uncontaminated fuel charge. This insures good ignition and a maximum rate of combustion during the early portion of the combustion period.

The initial burning heats the air present both by radiation and by compression due to the rising pressure in the combustion chamber. In effect, the burning gases "implode" on the auxiliary air and the air is heated to the highest possible temperature before being mixed with said gases. This action combines a fast initial combustion of an uncontaminated, substantially stoichiometric fuel mixture, with an excess of heated air to complete the reaction when it is needed. The process is carried out in a plain, compact combustion chamber which has minimum heat loss and maximum efficiency, and is so effective that it begins to work at once even when the engine is started cold. It is the only combination which will provide a fast burning, efficient combustion early in the power cycle, with a clean combustion substantially devoid of carbon monoxide and unburned hydrocarbons. This "two stage" combustion is unique in the internal combustion engine.

At part load operation, contamination of the fuel mixture by residual exhaust gases is more severe than at full load. The initial step toward reduction of contamination is to prevent the back flow of exhaust gases into the intake manifold. This can be done if the opening of the intake valve is delayed until the piston has traveled far enough down on the intake stroke to reduce the pressure in the cylinder to a value equal to or less than that in the manifold, but it is more practical to provide an auxiliary valve 35 in the intake manifold 18 in close proximity to the intake valve 16. This can be a check valve, which opens toward the cylinder, but it is sufficient, and simpler, to use a throttle as shown. The larger the volume of the intake manifold, the larger the volume of exhaust gases which can flow back into the manifold to equalize the pressure when the intake valve opens. Consequently, it is effective to divide the intake manifold into a large volume manifold 30 and a small volume manifold 31, and place the auxiliary throttle 35 in the large manifold. In this way, by closing throttle 35 completely at part-load and idle, only the small manifold is operative and this has the additional advantage that the velocity of the fuel mixture entering the cylinder, even under idling conditions, is sufficient to establish the desired circulation in the cylinder. Accordingly, at light load and idle, throttle 33 and auxiliary throttles 35 are completely closed. Power control is only by small throttle 34.

A typical mechanism for operating the engine is shown in FIG. 2. Throttle lever 50 is pivoted at 51, and has an arm 52 which engages rods 53 and 54, which latter operate throttles 34 and 33, respectively. A spring 55 normally holds throttle 33 closed, together with all the auxiliary throttles 35. Arm 52 can compress the spring and open said throttles by moving up and engaging collar 56. Rod 53, on the other hand, passes through a hole in arm 52 and has a collar 57 below arm 52 and a spring 58 supported by collar 59 above said arm. When throttle 50 is moved to the right, its first action is to open throttle 34, by acting against srping 58 and moving rod 53 up. When throttle 34 is fully open, it is prevented from moving more by coming against a stop 60. At this point, arm 52 engages collar 56 and begins to open throttle 33 against spring 55, while at the same time compressing spring 58. At full load, both throttles are fully open. Throttle 34 alone will produce about one-third of full power.

The auxiliary air admitted to the cylinders by throttle 38 is correlated to the throttle opening of carburetor 32, so that there is an excess of $O_2$ in the exhaust of about 3% at idle and 1% or 2% at full load. Larger quantities of excess air may, however, be admitted to the engine to insure that adequate air be present to compensate for abnormal conditions, such as carburetors adjusted too rich, excess fuel collected in cold manifolds and discharged into the engine during sudden load variations, and general deterioration of the engine due to age and wear causing excessive oil consumption. This insures a clean combustion even though the engine is in need of a tune-up or repairs. The air control is accomplished by means of the mechanism shown in FIG. 2. Throttle 38 is actuated by means of a center pivoted bar 61, having a rod 62 connected to throttle 34 and a rod 63 connected to throttle 33. It will be seen that opening throttle 34 will also open air valve 38 somewhat and that thereafter, the opening of throttle 33 will open air valves 38 still further, to admit as much air as required.

In a multiple cylinder engine having more than one cylinder connected to a common manifold, the air manifold and fuel mixture manifold must be kept separated. The air valves 26 are provided at the discharge ends of the air manifold for this reason. They open with the corresponding intake valve 16 for a given cylinder so that air can enter the fuel mixture manifold only when the fuel mixture in the manifold is entering the cylinder. In addition, only four, or at the most, six cylinders are connected to a single manifold to insure that there is no valve overlap. If this is not done, the air can enter the manifold and mix with the fuel mixture in the manifold, prior to its induction into the cylinder, forming a lean mixture. It will be evident that the action of valve 26 could be replaced by valve 16, if its back face 23 were ground to fit the open end of passage 25 accurately and closed said passage at the same time that said valve seated on intake valve seat 21.

The necessity for maintaining good mixture and residual gas and air separation in the cylinder at part-load is greater than at full load because the ratio of residual exhaust gas to fresh fuel mixture is greater at this time. The extreme condition is at idle and it is necessary that the small quantity of fuel mixture entering the cylinder have sufficient velocity to establish the pattern of circulation already described. For this reason, the branch manifolds 20 are made small in cross-section and are positioned at the side of the intake valve 16 closest to the periphery of the cylinder. The cylinder pattern at part-load and idle consists only of the outer flow 40 and the central air flow 43, with the residual exhaust gases at the lower and central part 68 of the cylinder as shown in FIG. 4. There is both an axial (with respect to the air) and a radial (with respect to the fuel mixture) separation of the exhaust gas and the active reagents.

It will be recognized that the relative size of the air volume 44 and exhaust volume 68 as indicated in FIG. 4, will vary widely with respect to each other and to the fuel mixture as the engine operation changes from full load to idle, and to over-speed coasting operation. The latter operation is the most difficult as the mixture volume is a minimum and the exhaust gas volume is a maximum. The dotted outline shown in FIG. 4 is representative of average conditions. During coasting, the exhaust gas fills almost the entire cylinder, and only the most effective concentration of the fuel mixture will produce a fuel charge that will fire. It is helpful to increase the amount of auxiliary air added at this time since carburetors frequently deliver "rich" mixtures under these conditions, and the time of ignition may also be advanced more than for normal operation. It is possible to obtain steady firing under conditions which cause any known prior art engine of the throttled power control type to misfire.

If desired, an additional auxiliary throttle 64 may also be placed in the small manifold 20, and be connected by rods 65 to throttle 34 in a manner so as to open and close with said throttle. In addition, it may be mounted on an axis 66 at the side of manifold 20 nearest to valve 16 and be oriented so as to direct the mixture passing through said valve to flow with maximum velocity adjacent the walls of said cylinder even when the engine is idling. This valve also impedes the entry of residual exhaust gases into the manifold when the intake valve opens, especially under idle and decleration when the pressure difference is a maximum and the quantity of fuel mixture entering the cylinder is a minimum.

Extending this design further, it is possible to enlarge manifold 20 and auxiliary valve 64 sufficiently to carry the full load fuel mixture and eliminate manifold 18 entirely. In this way, the desired mixture velocity can be maintained in a single manifold in place of the dual manifold.

The successful operation of the engine depends on the separation of the fuel mixture and the auxiliary air from its initial introduction into the engine until combustion is well established. It requires separation in the intake manifold, separation in the cylinder, and separation in the combustion chamber, and when these are properly co-ordinated, satisfactory operation is obtained.

It should be noted that the separation means are also effective in separating the fuel mixture from the residual products of combustion in the cylinder even when no auxiliary air is admitted. A substantial improvement in engine performance is obtained by this means alone without the use of auxiliary air. The improvement is due to both an increased rate of combustion and a very substantial suppression of detonation.

The engine shown in FIGS. 6, 7, and 8 is basically similar to the engine shown in FIGS. 1 and 2, but interchanges the position of the fuel and auxiliary air in the combustion chamber, and employs an additional valve in the cylinder head to admit the mixture. It is also shown as a single cylinder engine, but the modifications already described for multiple cylinder engines may be applied thereto.

A cylinder block 75 having a cylinder bore 76 with reciprocating piston 77 therein, has a cylinder head 78 fastened onto the upper end thereof. A hemispherical combustion chamber 79 is formed in head 78 which also includes intake valve 80, intake manifold 81, exhaust valve 82, and exhaust manifold 83. Said valves are operated in the conventional manner by means not shown.

Intake manifold 81 is arranged tangentially with respect to cylinder 76 as shown, and spark plug 84 is placed between the intake and exhaust valves near the axis of said cylinder. An auxiliary intake valve 85 which opens into the combustion chamber, is placed near said spark plug. An auxiliary intake manifold 86 leads to the seat controlled by said valve.

An auxiliary carburetor 87 is joined to said manifold 86, and a main carburetor 88 is joined to main intake manifold 81. Intake valves 80 and 85 are timed to open and close together, and during the intake stroke, a fuel mixture from carburetor 87 flows through manifold 86 as shown by flow line 89. The manifold has a large cross-section 90 immediately above the valve 85 which reduces the velocity of the mixture as it enters the combustion chamber radially as shown by arrows 91. This places the fuel charge near the top and center of the combustion chamber, and with a very small axial component of velocity.

Carburetor 88 has a throttle 92 and an auxiliary throttle 93 is provided in manifold 81 in close proximity to intake valve 80 to control the back flow of exhaust gases into the manifold. Throttles 92 and 93 are connected by means of rod 94 and open and close together. An air passage 95 close to manifold 81, but adjacent the periphery of said cylinder and tangential thereto, has an air flow control valve 96, pivoted at 97, near the outlet into said cylinder. Both air passage 95 and manifold 81 open into cylinder 76 through the single intake valve 80.

The basic method of operation is the same as in the engine shown in FIGS. 1 and 2. Initial power is obtained by opening throttle 98 only, and thereafter additional power is obtained by opening throttle 92 while throttle 98 remains open. Both throttles are connected to air valve 96 by means of rods 99 and 100 and a bar 101 centrally pivoted at 102, which operates said air valve, and admits air in proportion to the combined throttle opening. During the intake stroke, a substantially stoichiometric fuel-air mixture from carburetor 87 is supplied to the top, central zone of the combustion chamber 79 as indicated by arrows 91. Simultaneously, air, as indicated by arrow 103, flows around the periphery of said cylinder, and any fuel admitted from carburetor 88 flows parallel thereto in an inner stream 104.

Near the end of the compression stroke, the air is circulating near the periphery of the cylinder, the fuel mixture from the auxiliary carburetor 87 is in the top central zone of the combustion chamber, any mixture from carburetor 88 is in an inner peripheral zone, indicated by flow line 104, and the residual exhaust gases are in the lower central region above the piston. The piston 77, as shown in FIG. 8, has a beveled outer edge 105 which registers with the hemishperical combustion chamber to form a mild peripheral squish area, and a concave central area 106. The piston induces the peripherally circulating air stream 103 to turn inwardly and upwardly in a converging spiral flow 107, as shown in a flat projection in FIG. 8. The air flows in substantially the same manner as the fuel mixture 46 shown in FIG. 1, and displaces the fuel mixture from the apex of the combustion chamber at valve 85. When ignition occurs, shortly before TDC, the air is located in the upper part of the combustion chamber, with the fuel mixture located centrally above the piston 77. The long reach spark plug 84 has its electrodes 109 extend out into the fuel mixture through the converging air 107. Ignition of the concentrated and uncontaminated fuel mixture produces a fast burning combustion which heats the surrounding air before it becomes mixed with the burning gases.

With a separate auxiliary intake valve 85 and a special valve timing, the auxiliary fuel mixture can be introduced into the cylinder later in the cycle than the air and main fuel mixture through the main intake valve 80. For high performance engines with a large valve overlap, the delayed opening of valve 85 can minimize exhaust gas contamination by introducing the fuel after cylinder and manifold pressures have more nearly equalized.

A third embodiment of the invention is shown in FIGS. 9, 10, and 11. This engine also has dual intake valves but in addition has a toroidal ignition chamber which provides a positive and complete fuel charge separation from residual exhaust gases and excess air.

A cylinder block 110 having a cylinder bore 111 with reciprocating piston 112 therein, has a cylinder head 113 fastened onto the upper end thereof. A combustion chamber 114 of substantially hemispherical design is formed in head 113, which also includes valve seats for a conventional intake valve 115 and exhaust valve 116. Intake manifold 117 leads to the seat controlled by valve 115 and exhaust manifold 118 leads from the seat controlled by valve 116.

A toroidal ignition chamber 119 is joined to the combustion chamber 114 by a short passage 120 located substantially on the axis of cylinder 111. The ignition chamber includes a valve seat for an auxiliary intake valve 121 and an auxiliary intake manifold 122 leads to said seat. Just above the seat, the manifold is formed in a spiral groove 123 and the manifold is arranged tangentially with respect to said groove as shown. By means of this configuration, gases flowing into said ignition chamber from said manifold are given an axial spin and enter tangentially through said valve 121 in a uniform cone-shaped stream as indicated by arrows 124. A spark plug 125 having electrodes 126 extending out to the axis 127 of the toroidal chamber is screwed into the side of said chamber.

Auxiliary intake valve 121 is operated by a conventional rocker arm 128 and cam 130, and the main intake valve 115 is operated by the rocker arm 131, and cam 133. Cams 130 and 133 are formed so as to open valve 115 somewhat before valve 116 closes, but to open valve 121 well after valve 116 closes. As already described in the engine shown in FIGS. 6 and 7, the normal valve overlap in high-performance engines enhances contamination of the fuel mixture by exhaust gases, and this timing helps keep exhaust gases from entering the auxiliary intake manifold. It replaces the auxiliary throttle sometimes employed in the auxiliary manifold.

The intake manifold 117 is arranged tangentially with respect to the cylinder as shown and a carburetor 134 having a throttle 135 supplies a substantially stoichiometric fuel-air mixture to said manifold. An auxiliary carburetor 136 also having a throttle 137 supplies a substantially stoichiometric fuel-air mixture to the manifold 122 independently of carburetor 134, although both carburetors may be combined into a single unit as shown.

An auxiliary throttle 138 is provided in manifold 117 at a point adjacent said intake valve 115, and an air passage 139 is placed on the carburetor side of said throttle as shown. When throttle 138 is closed, this air passage is also closed with respect to the cylinder. An air flow control valve 140 is provided in air passage 139 and is connected by rod 141 to throttle 135 in a manner so they open and close together. A second air passage 142 of relatively small cross-section is located essentially parallel to said manifold 117 and opens into the manifold between the auxiliary throttle 138 and the intake valve 115. It has a first air flow control valve 143 which is connected to throttle 137 by a rod 144 which is arranged to open and close said valve and throttle simultaneously. A second air flow control valve 145 is also provided in parallel with said first valve and it is operated by engine speed responsive means, such as the centrifugal governor mechanism 146 as shown, and acting through rod 147. Other speed-responsive means such as diaphragms responsive to manifold pressure may also be used. The throttle 135 and the auxiliary throttle 138 are also connected by a rod 148 in a manner so said throttles open and close together. Finally, throttles 135 and 137 are so coordinated by means (not shown) but equivalent to those shown in FIGS. 1 and 2, which hold throttle 135 shut while throttle 137 controls the engine speed from idle to about one-quarter or one-third full load, and then open throttle 135, while throttle 137 is held open, to vary the power from one-quarter or one-third load to full load.

The basic mode of operation of this engine is similar to that of the engine shown in FIGS. 6, 7, and 8, except that an ignition chamber is employed and the auxiliary air control is more closely matched to the optimum requirements. At full load, all air valves and carburetor throttles are open and full charge of fuel-air mixture is taken into the cylinder during the intake cycle. The mixture from carburetor 136 flows in a stream 149 through manifold 122 and fans out from under valve 121 as shown by arrows 124 due to spin imparted to the mixture by passage through the spiral groove 123. The mixture then flows in a stream 150 around the peripheral region of the toroidal chamber 119 and spirals inwardly to flow out of passage 120 still in a spin, as shown, radially into the top of the combustion chamber 114 and with a minimum downward component of velocity. The charge stays in the top of the cylinder. Simultaneously a fuel-air mixture from carburetor 134 flows in a stream 151 through manifold 117, through intake valve 115, and into cylinder 111 to circulate in a spiral path as shown. This circulation and that of the mixture flowing out of passage 120 circulates in the same band. Auxiliary air, entering the cylinder through air passages 139 and 142, in streams 152 and 153, respectively, also circulates in the same band and adjacent the cylinder wall.

During the compression cycle, most of the fuel mixture and auxiliary air is compressed into the combustion chamber 114, but a proportionate quantity is also compressed into the ignition chamber 119. The inward flow 154 into the ignition chamber shown in FIG. 10 induces a toroidal circulation 155 therein about the axis and said toroid, which acts to concentrate the fuel mixture along said axis, while auxiliary air and some fuel mixture circulate around it.

The substantially uncontaminated ignition charge is then ignited by spark plug 125, and the expanding flaming gases induce a second toroidal circulation in chamber 114 as shown by lines 156. This picks up the remaining auxiliary air which has been localized near the periphery of said combustion chamber, and mixes it with the burning gases after combustion has been well initiated. Thus, the total combustion takes place in two stages, first in the ignition chamber, and secondly in the combustion chamber, the latter being induced by the former. Each combustion is initiated in a substantially uncontaminated, stoichiometric fuel mixture, surrounded by auxiliary air, which is then heated by the combustion before being mixed with it.

At light load and idle operation throttles 135 and 138 are closed. The only fuel mixture supplied to the engine enters through valve 121 from carburetor 136. Auxiliary air supplied to the engine enters through the passage 142. Proper separation of air, residual exhaust gases, and fuel mixture can be obtained only if an axial circulation is initially established in the cylinder. This can be done only by means of the air and fuel mixture admitted, and since at idle in particular, and light load also, the quantity of air and fuel mixture admitted is quite small relative to the mass of residual exhaust gases present, a circulation can be induced only if the air and mixture admitted are directed in at high velocity. To this end, the air passage 142 is made small in cross-section and the air admitted can be controlled externally away from the valve 115, which is convenient. The spiral flow induced in the mixture by the groove 123 is also particularly effective in establishing a circulation in the cylinder, and in purging the ignition chamber of exhaust gases during the intake cycle. When the intake manifold 122 is made with a small cross-section and volume, the use therein of an auxiliary throttle analogous to throttle 138, may be dispensed with.

The quantity of air admitted when the engine is idling is such as to provide about a 3% excess of oxygen. When the engine is over-speeded at closed throttle, as is encountered in road vehicles when coasting, the mixture and auxiliary air balance is disturbed. A poorly designed carburetor tends to deliver a fuel-air mixture under overspeed conditions which is quite rich, and this can most easily be compensated for by supplying a larger quantity of auxiliary air at this time. On the other hand, even a well designed carburetor has difficulty at over-speed conditions because the charge delivered to the engine becomes smaller at high speed, relative to the fixed quantity of residual exhaust gas in the cylinder. Only by means of the best charge localizations and the addition of a relatively large quantity of auxiliary air to dilute the exhaust gas can good firing of the small charges be obtained under these conditions. A governor 146 (or equivalent means) is provided, which acts, by means of rod 147, to open valve 145 when engine speed is high, and to close this again when the engine returns to normal idle speed. When the idle charge is properly localized, the engine will start and idle without "choking" and when supplied with the proper quantity of auxiliary air, can accelerate and decelerate without emission of objectionable unburned hydrocarbons or carbon monoxide.

Above about one-quarter load throttles 135 and 138 and air valve 140 are opened to admit additional fuel mixture and auxiliary air. The air passage 139 directs the air in a stream 152 tangentially against the cylinder walls parallel to the air stream 153 supplied through small passage 142. The fuel mixture supplied by carburetor 134 circulates about the cylinder axis in a stream 151 inside said air. The auxiliary throttle 138 functions as before, to minimize backflow of residual exhaust gases into manifold 117 during operation at low manifold pressure (high vacuum).

It will be evident that many more combinations of the elements shown can be made than are illustrated herein. For example, the relative position of the fuel mixture and auxiliary air can be interchanged, with suitable relocation of the spark plug, and the separate features shown only on the specific embodiments herein may be applied to the others as well.

It is understood that the engines described are not limited to the precise structure shown and described, but also include such modifications as may be embraced within the scope of the appended claims.

We claim:

1. In the operation of an internal combustion engine of the spark ignition type which utilizes dual bodies of working fluid in stratified relation in the combustion process, of which one body is a substantially stoichiometric fuel-air mixture and the other body contains at least some excess air, the method of holding said bodies in stratified relation in said engine at least up to the time of ignition, which includes as steps: positioning said body of working fluid containing excess air along an axis substantially co-axial with the cylinder of said engine; directing the body of working fluid consisting of a fuel-air mixture to circulate about said axially positioned body; maintaining said circulation while compressing said bodies of working fluid; directing said circulating body of working fluid to converge, toward the end of compression, in a spiral flow toward and around said axis in a body of limited thickness in the axial direction; and displacing, thereby, that portion of said axially positioned body of working fluid containing air which occupied the region around said axis taken by said fuel-air mixture, whereby said bodies are positioned in a relatively axial separation substantially after compression but prior, at least in part, to ignition of said fuel-air mixture.

2. A method of operation as in claim 1, which includes as steps: positioning said body of working fluid containing excess air along said axis in a partially confined region; directing said converging body of working fluid consisting of a fuel-air mixture to the most remote end of said partially confined region; and displacing, thereby, the body of working fluid containing excess air from said partially confined region into an unconfined region in direct and unrestricted contact with said body of fuel-air mixture.

3. A method of operation as in claim 1 which includes as steps: directing said circulating body of fuel-air mixture along said axis toward said body of displaced working fluid containing air to displace said body further along said axis; and directing said body of fuel-air mixture, at least in part, to expand radially from said axis in a plane substantially normal to said axis to diffuse said fuel-air mixture, and form a zone of relatively diffused mixture between said high velocity converging fuel-air mixture and said displaced body of working fluid containing air, whereby said bodies are maintained separate during and after the displacement along said axis, of said body containing air.

4. In the operation of an internal combustion engine of the spark ignition type which utilizes dual bodies of working fluid in stratified relation in the combustion process, of which one body is a substantially stoichiometric fuel-air mixture and the other body contains at least some excess air, the method of holding said bodies in stratified relation in said engine from the time of induction until at least up to the time of ignition, which includes as steps: directing said body of fuel-air mixture to circulate in said engine in a relatively high velocity and dynamically stable flow; holding said body containing excess air in a relatively diffused and quiescent body adjacent to said circulating body; diffusing a portion of said circulating body of fuel-air mixture; and directing said diffused portion of fuel-air mixture to a position between said circulating fuel-air mixture and said body of working fluid containing excess air to separate said bodies, whereby said body of relatively high velocity fuel-air mixture and said relatively quiescent body of working fluid are restrained from intermixing at least prior to ignition of the fuel-air mixture.

5. A method of operation as in claim 4 in which said portion of fuel-air mixture is diffused by radial expansion from the axis of circulation of said circulating fuel-air mixture.

6. A method of operation as in claim 4 in which said fuel-air mixture is ignited at a point in said diffused portion of said fuel-air mixture.

7. In an internal combustion engine of the type which utilizes dual bodies of working fluid, of which one consists of a substantially stoichiometric fuel-air mixture and the other contains at least some excess air, and which holds said bodies separate in the cylinder and combustion chamber of said engine at least up to the time of ignition of said fuel-air mixture, the combination of: a piston in said cylinder; a cylinder head forming, in combination with said piston, a combustion chamber substantially in the form of a figure of revolution about the length axis of said cylinder with at least some peripheral squish zone around said chamber; valve means for admitting said fuel-air mixture to said cylinder; wall means associated with said valve means to direct said mixture to flow in a circulating path in said cylinder about the central length axis of said cylinder; means to admit said body of working fluid containing excess air to the central axial zone of said cylinder; means to drive said piston close to said cylinder head at the end of the compression stroke to displace said circulating fuel-air mixture from said peripheral squish zone toward said central axis and thereby partially displace said axially positioned body of working fluid containing excess air from said axial position, whereby said dual bodies of working fluid both become axially positioned in said cylinder in separate but adjoining bodies; and ignition means in said combustion chamber positioned to ignite said fuel-air mixture therein.

8. An apparatus as in claim 7 which includes the combination of: a substantially conically shaped cavity in said cylinder head forming a substantially hemispherical combustion chamber therein, with the apex thereof substantially on the length axis of said cylinder.

9. An apparatus as in claim 8 which includes the combination of: a spark plug positioned relatively near said apex, and having extended electrodes which place the spark gap out in the combustion chamber away from the substantially conical walls of said chamber.

10. An apparatus as in claim 8, which includes the combination of: said means for admitting said working fluid containing air to said cylinder positioned to introduce said body near to the apex of said combustion chamber; and said valve means for admitting said fuel-air mixture to said cylinder positioned away from said apex and near the periphery of said cylinder, whereby said fuel-air mixture is introduced into said cylinder in a flow remote from said body of working fluid containing air positioned substantially near the apex of said combustion chamber.

References Cited

UNITED STATES PATENTS

| | | | |
|---|---|---|---|
| 1,342,449 | 6/1920 | Konar | 123—75 |
| 1,555,991 | 10/1925 | Konar | 123—75 |
| 1,825,817 | 10/1931 | Patterson | 123—75 |
| 2,466,181 | 4/1949 | Myrick | 123—75 |
| 3,318,292 | 5/1967 | Hideg | 123—75 |

WENDELL E. BURNS, *Primary Examiner.*

U.S. Cl. X.R.

123—30, 32